United States Patent [19]

Rose

[11] 3,776,064
[45] Dec. 4, 1973

[54] STEERING WHEEL CONTROL DEVICE

[75] Inventor: Jack B. Rose, Southfield, Mich.

[73] Assignee: Rowin, Incorporated, Warren, Mich.

[22] Filed: Aug. 2, 1972

[21] Appl. No.: 277,479

[52] U.S. Cl. ............................................... 74/557
[51] Int. Cl. ........................................... B62d 1/06
[58] Field of Search ..................................... 74/557

[56] References Cited
UNITED STATES PATENTS

| | | | |
|---|---|---|---|
| 2,274,069 | 2/1942 | Johnson | 74/557 |
| 2,166,296 | 7/1939 | Hoover | 74/557 |
| 2,168,961 | 8/1939 | Ragan | 74/557 |
| 2,172,121 | 9/1939 | Buchanan | 74/557 |
| 2,305,527 | 12/1942 | Hassett | 74/557 |
| 2,317,307 | 4/1943 | Snow | 74/557 |

Primary Examiner—Charles J. Myhre
Assistant Examiner—F. D. Shoemaker
Attorney—Franklin E. Quale

[57] ABSTRACT

The device, as applied to a conventional automobile steering wheel, essentially comprises a rigid upper molded plastic mounting plate member of generally segmental outline at a portion thereof which is contoured in section to nest over a corresponding segmental portion of the wheel facing the driver; a lower, opposite side plastic member mated to the upper at generally circular portions of said members, which portions are fixedly screw-secured together; and a hand grip member of the same plastic material which is cross sectioned to afford a circular, radially outward guide rib. This rib fits for rotative running action in a circular, radially internal guide groove defined between annular shoulders of the respective mated upper and lower members. The hand grip member provides a diametral cross bar to be grasped by the driver; and the assembly of members and grip has means to rigidly apply it to the steering wheel, in the form of a pair of like, arcuately spaced and semicircular clamp straps applied in encircling relation to the wheel cross section and tightly screw-connected to the upper mounting plate member. Plate, grip and strap components of the device are of a glass-filled mylon plastic composition requiring no lubrication for a free running action of its hand grip in the guide way afforded by the two plate members.

4 Claims, 6 Drawing Figures

PATENTED DEC 4 1973 3,776,064
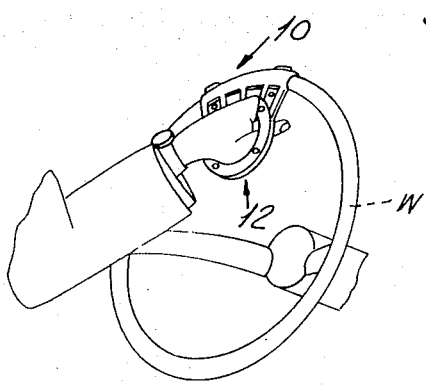
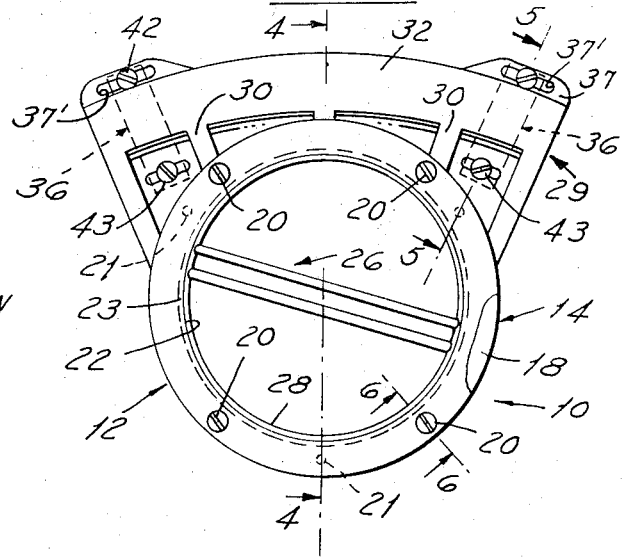
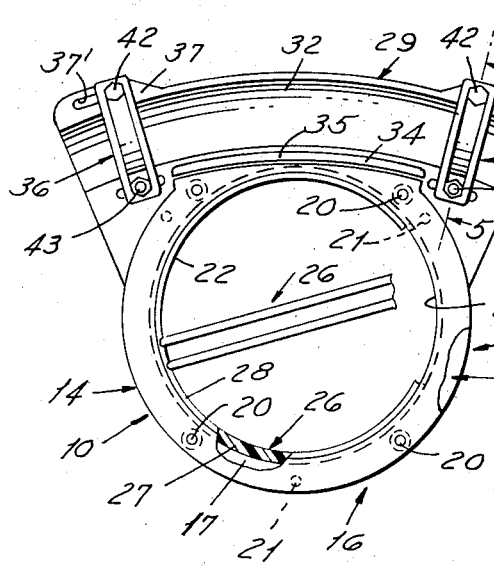
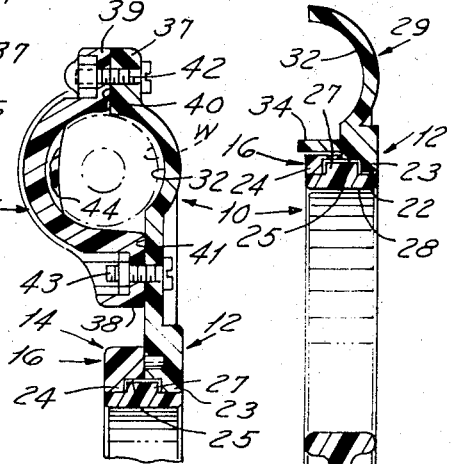
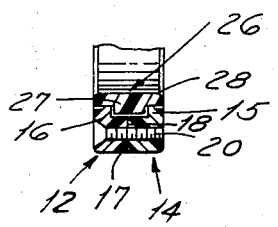
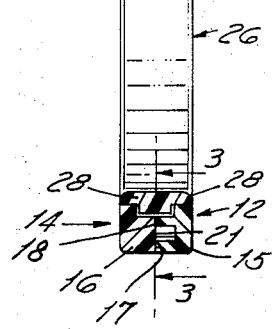

STEERING WHEEL CONTROL DEVICE

BACKGROUND OF THE INVENTION

1. Field of the Invention

The device has application in assisting of the one-hand manipulation of an automobile steering wheel, whether that of a passenger vehicle or of various types of truck, bus or commercial vehicle. Non-vehicular adaptations are also contemplated.

2. Description of the Prior Art

A search has revealed as most pertinent art the patent to Heckman, U.S. Pat. No. 1,677,082 of July 10, 1928. This relates in only the most general way to the subject matter of the invention, and has defects not present in the subject control device. For one example, the application of the Heckman wheel device requires a major mutilation of the steering wheel of which it is an intended adjunct.

SUMMARY OF THE INVENTION

The present wheel control device, as inexpensively constituted by only three major molded plastic components, plus simple clamp means as referred to in the Abstract, lends itself to mass production at low cost using relatively simple and long-lived production molds. Its design in cross section is such that a single size, due to the arcuate curvature and transverse cross section of its upper or front mounting plate member will matingly accommodate a large number of steering wheel sizes on automobiles produced by the four major domestic and many foreign automotive manufacturers.

In accordance with one feature of the improvement of the device, the clamp elements which mount its upper plate to the wheel are each contoured in section to provide an internal nodular formation which mates into one of the usual scalloped grip formations on the steering wheel, thus positively preventing any degree of rotative shift of the device in relation to the periphery of the wheel. As indicated in the Abstract, the device is in effect self-lubricating to afford a very free running action of its hand grip within a transversely confined by the upper and lower plate components.

As necessarily contoured in large portion of generally circular outline, the guide way-affording plate members themselves have a partially nested, external relation to one another, over and above their axially nested, mating interfit, as at an arcuate segmental top portion of the lower or rear member generally keyed with a corresponding arced, rearwardly projecting locating rib formation on the upper front plate member. In addition to these coacting molded contours, one of the plate members carries integral locating studs mating frictionally in correspondingly spaced recesses in the other plate member. Thus, those members, with the assistance of their locking screw means, are very strongly located and anchored against shift relative to one another, both transverse-wise and in the plane of action of the hand grip which they rotatively guide.

In use, the control device greatly increases the maneuverability of a wheel, whether by ladies, by persons of other than normal stature, by drivers of "semi's" and other types of truck in normally difficult parking or other operations, and the like. A complete 360° wheel turn may be made with one hand without twisting of the wrist or straining, and awkward hand-over-hand movements are of course unnecessary.

BRIEF DESCRIPTION OF THE DRAWINGS

FIG. 1 is a schematic view indicating the manner of intended manipulation of the improved device as applied to an automobile steering wheel;

FIG. 2 is a partially broken front elevational view in approximately one-half scale showing the device per se;

FIG. 3 is a view in rear or bottom elevation, being also partially broken away and sectioned on a line corresponding to line 3—3 of FIG. 4;

FIG. 4 is an approximately full scale sectional view showing assembled upper plate, lower plate and hand grip components of the device per se, being in vertical transverse cross section on a line corresponding to line 4—4 of FIG. 2;

FIG. 5 is a fragmentary view in similar transverse section along a line corresponding to line 5—5 of FIG. 2, illustrating the device as operatively strap-clamped to a steering wheel, indicated in dot-dash line; and FIG. 6 is a fragmentary view in section on line 6—6 of FIG. 2, showing a detail of the screw assembly of plate and hand grip members.

DESCRIPTION OF A PREFERRED EMBODIMENT

FIG. 1 of the drawings shows the steering control device of the invention, generally designated by the reference numeral 10, as operatively applied to a typical automobile steering wheel W and manipulated in the intended fashion. The location will preferably be at an angular position somewhat to the left, or counterclockwise, of a vertical plane including the wheel axis, but any other angular relationship which suits the convenience and comfort of the driver is of course possible.

As better illustrated in more detail in FIGS. 2 and 3, device 10 essentially comprises a front or upper plate member 12 and a co-acting rear or lower member 14, these being molded in a generally flat or planar shape to afford arcuate like base portions, respectively designated 15, 16, which meet (FIG. 4) in a plane represented by front-to-rear abutting annular faces 17, 18 thereof, said plane being midway of the major front-to-rear dimension of the device 10. Four equally spaced self-threading screws 20, assisted by locating studs or pins 21 molded as integral projections on the annular base portion 16, locate and hold the front and rear mounting plate members 12, 14 in fixed relation to one another. As appears in FIG. 6, the screws 20 are received in countersunk recesses of front member 12, engaging in a self-tapping way in aligned openings in rear member 14, with the screw heads flush with the forward surface of member 12 for an attractive appearance; and the studs 21 (FIG. 4) have a tight frictional fit in correspondingly spaced recesses in the meeting surface 18 of plate member 12.

As best shown in FIGS. 4 and 5, the front or top mounting plate member 12 presents a circular opening 22 defined by an annular circular and radially inwardly extending shoulder flange formation 23 of said member; and the co-acting rear member 14 presents a coaxial opening of the same diameter, defined by a radially inwardly extending circular shoulder formation 24 of member 14. Thus the aligned shoulders 23, 24, as axially spaced from one another on either side of the meeting plane at surfaces 17, 18 in the assembled condition of the device 10, afford a circular groove or way 25 which slidably guides with reasonable running tolerance a circular hand grip piece 26. The latter includes a radially outwardly projecting guide tongue or rib portion 27 received and running rotatively between shoulders 23, 24, and laterally projecting axial flange portions 28 which transversely and radially underlie the circular surfaces of the coaxial openings in the respective front and rear mounting plate members 12, 14, as shown in FIG. 4.

In a transverse zone, centered at the central transverse plane 4—4 of that figure, the front mounting member is molded to provide an integral, radial outwardly extending segmental flange extension 29 of substantial area, the general external outline of which is that of a quadrant of considerably larger radius than that of the circular grip guide formations 15, 16 of the respective plate members 12, 14; and segment 29 may be ribbed, as at 30 (FIG. 2) for an ornamental and/or rigidifying effect. More importantly, the segment extension 29 is molded to afford an arcuate mounting seat or saddle 32 of somewhat less than semi-circular outline in section, as appears in FIGS. 4 and 5. This seat is coextensive arcuately with the flange member 29 and of arcuate contour and depth such that it will accommodate wheels of varying diameter as to their own overall size and section. That is, the arcuate length, curvature and sectioning of seat 32 are such that, regardless of some variation in its own and the wheel's diameter, both overall or in its cross section, the wheel W will take wedging engagement in the saddle or seat 32 at more than one point, as clamped therein by means to be described.

Inwardly of the seat 32, the front mounting plate member 12 is molded, as appears in FIGS. 3 and 4, to provide a rearwardly projecting, segmentally arcuate locating rib or ledge 34 of a diameter to parallel its seat 32, and of an arcuate length only slightly less than the diameter of the plate opening 22. This ledge is, at its arcuate center point in the plane 4—4 of FIG. 2, spaced but slightly outwardly of guide way 25 in which the rib 27 of hand grip 26 runs rotatively, but is of course more widely spaced from opening 22 as the ledge 34 angularly diverges in opposite directions, as appears in FIG. 3. The ledge affords a further, radially outward surface at 35 (FIG. 3) in relation to which the steering wheel may bindingly engage as clamped behind mounting plate member 12. Ledge 34 also serves as a locator enabling a rough proper angular positioning of lower plate member 14 in relation to upper plate member 12 prior to the final assembly of the parts.

A pair of specially contoured clamping straps or stirrups 36 clampingly engage plate 12 and wheel W to hold the device 10 as a whole in its operative assembly to the wheel. For coaction with these straps, the segment extension 29 of plate 12 is formed with a pair of integral spaced projecting ears 37 each having an elongated slot 37'. Each clamping strap 36 (FIG. 5) is further provided with thickened radially inner and outer bosses 38, 39, respectively, which will have rearward abutting engagement with currespondiing surface portions 40, 41 of segment formation 29, the bosses 38, 39 as appear in FIG. 5, being offset in planes paralleling the meeting plane of the plate members 12, 14 at their abutting surfaces 17, 18 (FIG. 4). Strap clamping screw and nut sets 42, 43 engage through corresponding opposite end openings in the strap bosses 38, 39 and in the plate ear slots 37', the radially outermost of these sets preferably employing acorn nuts which are received in counterbores of the outer strap bosses 39, thus to avoid snagging of the driver's sleeve. A considerable degree of latitude of adjustment of the device 10 relative to wheel W is made possible due to the elongated nature of the slots 37'.

Finally, as an additional safety factor, each of the stirrup straps 36 is preferably formed, as shown in FIG. 5, with an integral projecting rounded node 44, which will nest or mate into one or another of the usual undulatory valleys commonly formed on the wheel for a better driver grip. Formation 44 performs the same function, but a bit differently in behalf of the device 10, i.e., in positively locking it against sliding displacement relative to the wheel in any one of many different possible positions on the latter.

What is claimed is:

1. A control device applicable to a manipulating wheel without alteration of the latter, comprising a pair of rigid front and rear, matingly engaged mounting plate members, each formed in cross section to provide therebetween a circular guide way, a hand grip rotatable in said way and restrained between said plate members against transverse shift relative to said way, and means fixedly mounting said plate members in said mated engagement with one another to said wheel, said means including an arcuate portion of substantial circumferential extent formed integral with the rigid front plate member and disposed radially outwardly of said guide way, said portion being of an arcuate cross transverse section to mate substantially fully over and about the front cross-sectional contour of said wheel in the plane of the latter, a pair of rigid clamp straps of relatively small circumferential extent shaped to mate substantially fully under and about the rear cross-sectional contour of the wheel in said plane of the latter, and screw means spanning opposite radial sides of the full wheel cross-sectional contour and releasably connecting said front and rear members to the wheel at said arcuate portion of the former member and at said straps.

2. The control device of claim 1, in which said clamp straps each have an internal specially shaped formation facing a surface of the wheel and having nested engagement with an external scallop formation on the said wheel surface.

3. The control device of claim 1, in which said plate member and said grip are molded of a glass-filled plastic composition for a self-lubricating rotative running action of the latter in said circular guide way.

4. The control device of claim 2, in which said plate members and said grip are molded of a glass-filled plastic composition for a self-lubricating rotative running action of the latter in said circular guide way.

* * * * *